(12) United States Patent
Childers et al.

(10) Patent No.: US 8,032,003 B2
(45) Date of Patent: Oct. 4, 2011

(54) FIELD INSTALLABLE FERRULE AND TOOL AND METHOD FOR INSTALLING OPTICAL FIBERS IN THE FERRULE USING THE TOOL

(75) Inventors: Darrell R. Childers, Hickory, NC (US); Joseph Howard, Hickory, NC (US); Eric Kent, Hickory, NC (US); Lisa Hart, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 13/039,255

(22) Filed: Mar. 2, 2011

(65) Prior Publication Data

US 2011/0150409 A1 Jun. 23, 2011

Related U.S. Application Data

(62) Division of application No. 12/391,134, filed on Feb. 23, 2009.

(51) Int. Cl.
*G02B 6/00* (2006.01)

(52) U.S. Cl. .................................... 385/147; 385/78
(58) Field of Classification Search .................. None
See application file for complete search history.

(56) References Cited

U.S. PATENT DOCUMENTS

| | | | | |
|---|---|---|---|---|
| 6,634,797 | B2 * | 10/2003 | Yang et al. | 385/59 |
| 6,722,791 | B2 * | 4/2004 | Cheng et al. | 385/83 |
| 6,769,811 | B2 * | 8/2004 | Hall et al. | 385/59 |
| 7,588,374 | B2 * | 9/2009 | Nishimura et al. | 385/60 |
| 7,680,384 | B2 * | 3/2010 | Billman et al. | 385/134 |
| 2003/0198442 | A1 * | 10/2003 | Cheng et al. | 385/83 |
| 2009/0097801 | A1 * | 4/2009 | Nishimura et al. | 385/78 |
| 2010/0316344 | A1 * | 12/2010 | Bylander et al. | 385/134 |

* cited by examiner

*Primary Examiner* — Sung Pak
(74) *Attorney, Agent, or Firm* — Michael L. Leetzow, P.A.

(57) ABSTRACT

A field-installable multi-fiber ferrule has two portions and one portion has optical fibers already secured therein. The second portion receives optical fibers to mate with the secured optical fibers. A tool is provided to assist in inserting the optical fibers into the multi-fiber ferrule by aligning and holding the optical fibers while they are secured in the multi-fiber ferrule.

13 Claims, 11 Drawing Sheets

FIELD INSTALLABLE FERRULE AND TOOL AND METHOD FOR INSTALLING OPTICAL FIBERS IN THE FERRULE USING THE TOOL

REFERENCE TO RELATED CASE

This application is a divisional application of U.S. patent application Ser. No. 12/391,134, which claims priority under 35 U.S.C. §119 (e) to provisional application No. 61/030,545, filed on Feb. 21, 2008, and provisional application No. 61/030,895, filed on Feb. 22, 2008, which are hereby incorporated by reference in their entirety.

BACKGROUND OF THE INVENTION

1. Field of the Invention

The present invention relates generally to a field-installable fiber optic ferrule, a tool that can be used with the fiber optic ferrule and a method of assembling a multi-fiber ferrule using the tool.

2. Technical Background

Multi-fiber ferrules are used in a vide variety of optical interconnect applications, including bulkhead feed-through connectivity, optical back planes, and outside feed plant passive optical networks. The typical MT ferrule is comprised of at least one fiber array with up to twelve 125 micron diameter fibers on a 250 micron centerline spacing. The MT ferrule has rectangular cross section of 2.4 millimeters by 6.4 millimeters and depth of 8 millimeters. The ferrules are generally molded from a highly glassed-filled, thermoplastic or thermoset resin, which combines the durability and stability required of a connector with the precision necessary to maintain low-loss single mode core-to-core alignment across multiple fibers. While these can be easily manufactured and assembled in a factory setting, it is more difficult to do so in the field, where field installable connectors are often used either to provide quick installations or to repair damaged connectors. A field installable MTP connector is available, but not a field installable MT ferrule.

To assemble the MT ferrule in the field, a number of optical fibers, typically 12 optical fibers, need to be aligned with the fiber holes or micro holes in the multi-fiber ferrule. Although not impossible, lining up the optical fibers with the micro holes can be difficult to do in the field. It is also difficult to secure the optical fibers in the holes while maintaining the optical fibers in placement relative to one another.

It would be desirable therefore to provide a field installable multi-fiber ferrule and a tool that can be used with the multi-fiber ferrule to assist in inserting and securing the optical fibers in the multi-fiber ferrule.

SUMMARY OF THE INVENTION

Disclosed herein is a multi-fiber ferrule that includes a front ferrule portion having at least six openings extending between a front face and a rear face, optical fibers secured in the at least six openings, a rear ferrule portion having a front face and at least one wall member extending from the front face, the rear ferrule portion having a corresponding number of openings extending through the front face, the openings in the front ferrule portion and rear ferrule portion in optical alignment, and a recessed portion disposed in the front face of the rear ferrule portion, the corresponding number of openings in the rear ferrule portion opening in the recessed portion.

In some embodiments, an index matching gel is disposed between the front ferrule portion and the rear ferrule portion.

In another aspect, a multi-fiber ferrule is disclosed that includes a front ferrule portion having at least six openings extending between a front face and a rear face, optical fibers secured in the at least six openings and a rear ferrule portion having a front face and at one wall member extending from the front face, the rear ferrule portion having a corresponding number of openings extending through the front face, the openings in the front ferrule portion and rear ferrule portion in optical alignment.

In another aspect, a method is disclosed of assembling a multi-fiber ferrule that includes the steps of providing a front ferrule portion having at least six openings extending between a front face and a rear face, securing at least two optical fibers into respective openings in the front ferrule portion, polishing the front face of the front ferrule portion, removing any optical fibers extending behind the rear face of the front ferrule portion, providing a rear ferrule portion having a front face and at one wall member extending from the front face, the rear ferrule portion having a corresponding number of openings extending through the front face, securing the front ferrule portion in the rear ferrule portion, and securing a corresponding number of optical fibers into the rear ferrule portion in openings such that the optical fibers in the rear ferrule portion are in optical alignment with respective optical fibers in the front ferrule portion.

In yet another aspect, a method of inserting at least two optical fibers into a multi-fiber ferrule is disclosed, the at least two optical fibers have a bare fiber portion and a matrix covered portion and includes the steps of inserting multi-fiber ferrule into a fiber loading device, placing the at least two optical fibers onto channels disposed on the fiber loading device, sliding the at least two optical fibers into the multi-fiber ferrule wherein the bare fiber portion is disposed within the multi-fiber ferrule, removing the channels from contact with the at least two optical fibers, sliding the at least two optical fibers farther into the multi-fiber ferrule wherein at least a portion of the matrix covered portion of the at least two optical fibers are disposed within the multi-fiber ferrule, and securing the at least two optical fibers into the multi-fiber ferrule.

In another aspect, a fiber loading device for loading at least two optical fibers into a multi-fiber ferrule is disclosed, the device including a channel configured to receive the at least two optical fibers, a multi-fiber ferrule holder in communication with the channel, the multi-fiber ferrule holder configured to receive a multi-fiber ferrule for insertion of the at least two optical fibers, a lower movable member having optical fiber locators therein, the lower movable member positioning the at least two optical fibers to align with the multi-fiber ferrule, an upper movable member configured to make contact with the at least two optical fibers from an upper position, and a lever operatively connected to the lower movable member and the upper movable member to move the lower movable member and the upper movable member relative to the channel and multi-fiber ferrule holder.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
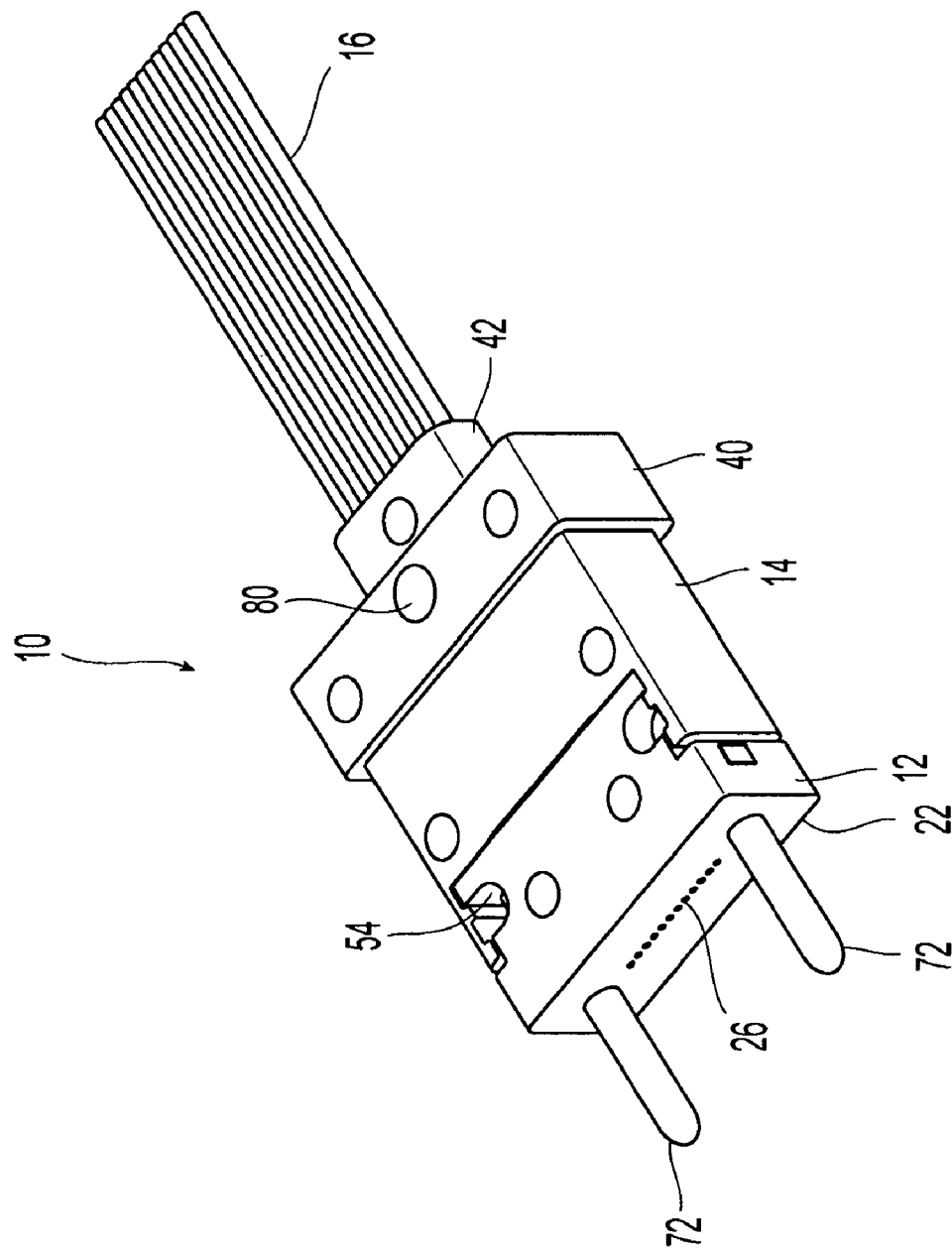
FIG. 1 is a perspective view of one embodiment of a multi-fiber ferrule according to the present invention.
Figure 2:
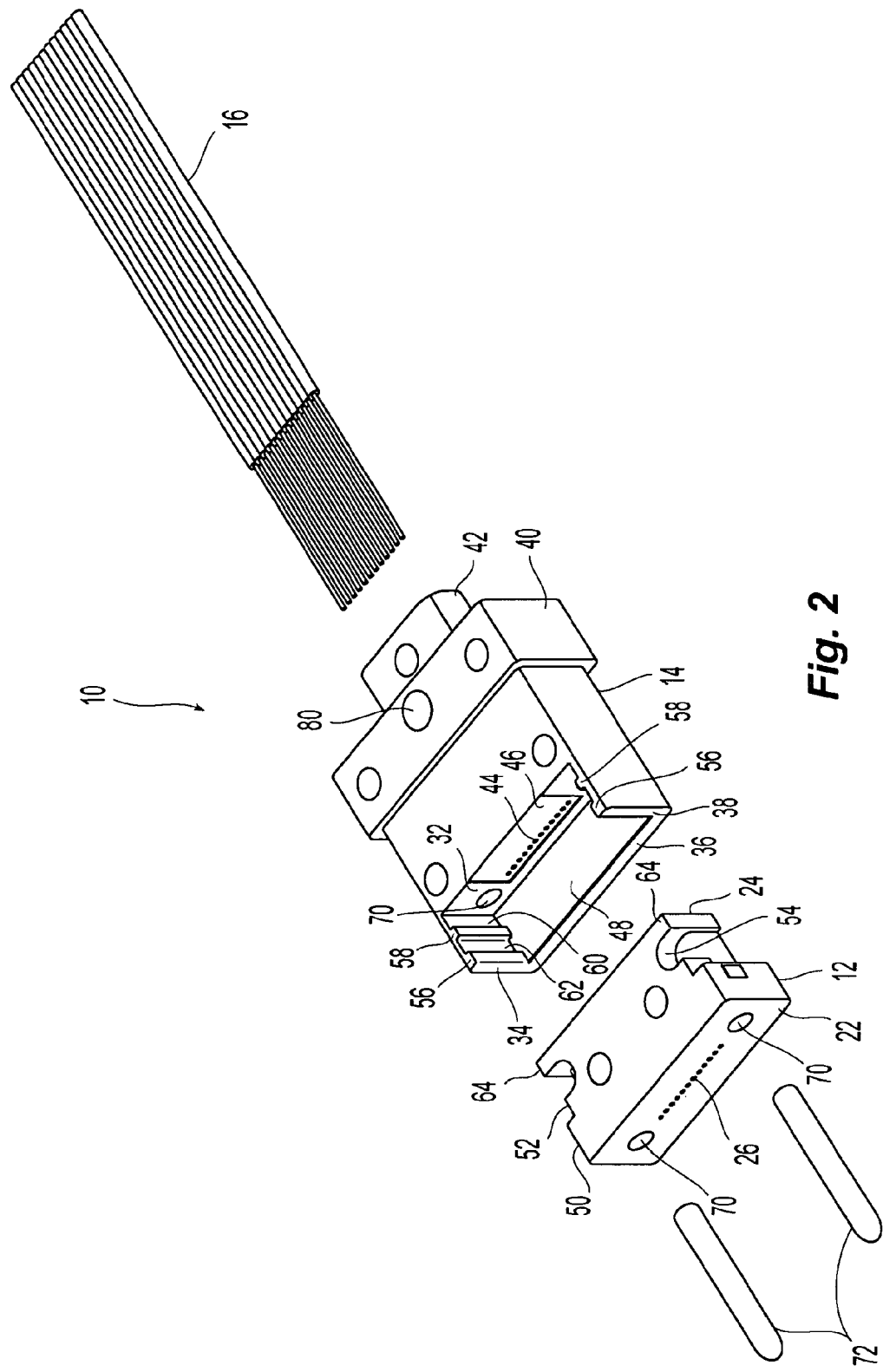
FIG. 2 is an exploded view of the multi-fiber ferrule of FIG. 1.
Figure 3:
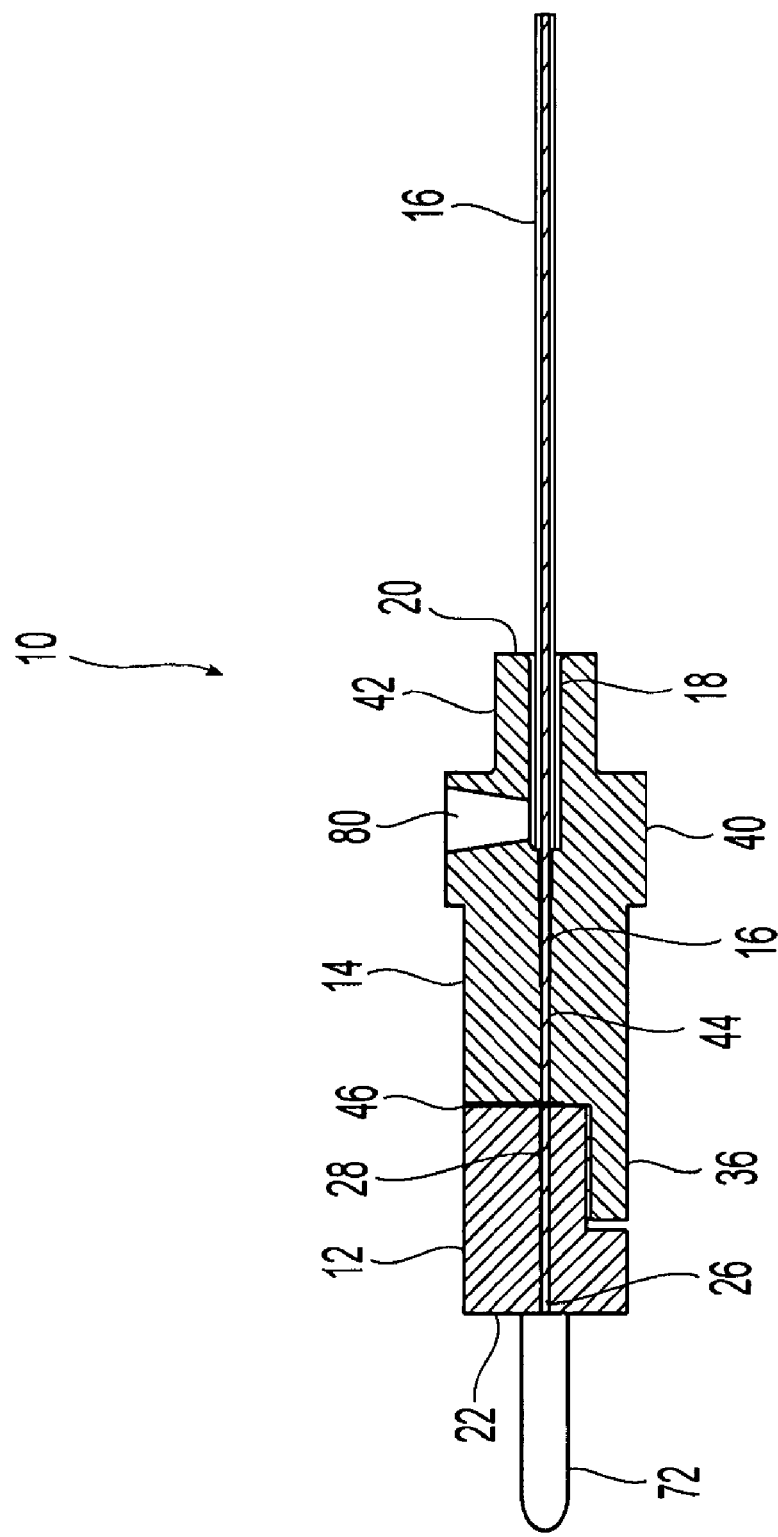
FIG. 3 is a longitudinal cross section of the multi-fiber ferrule of FIG. 1.
Figure 4:
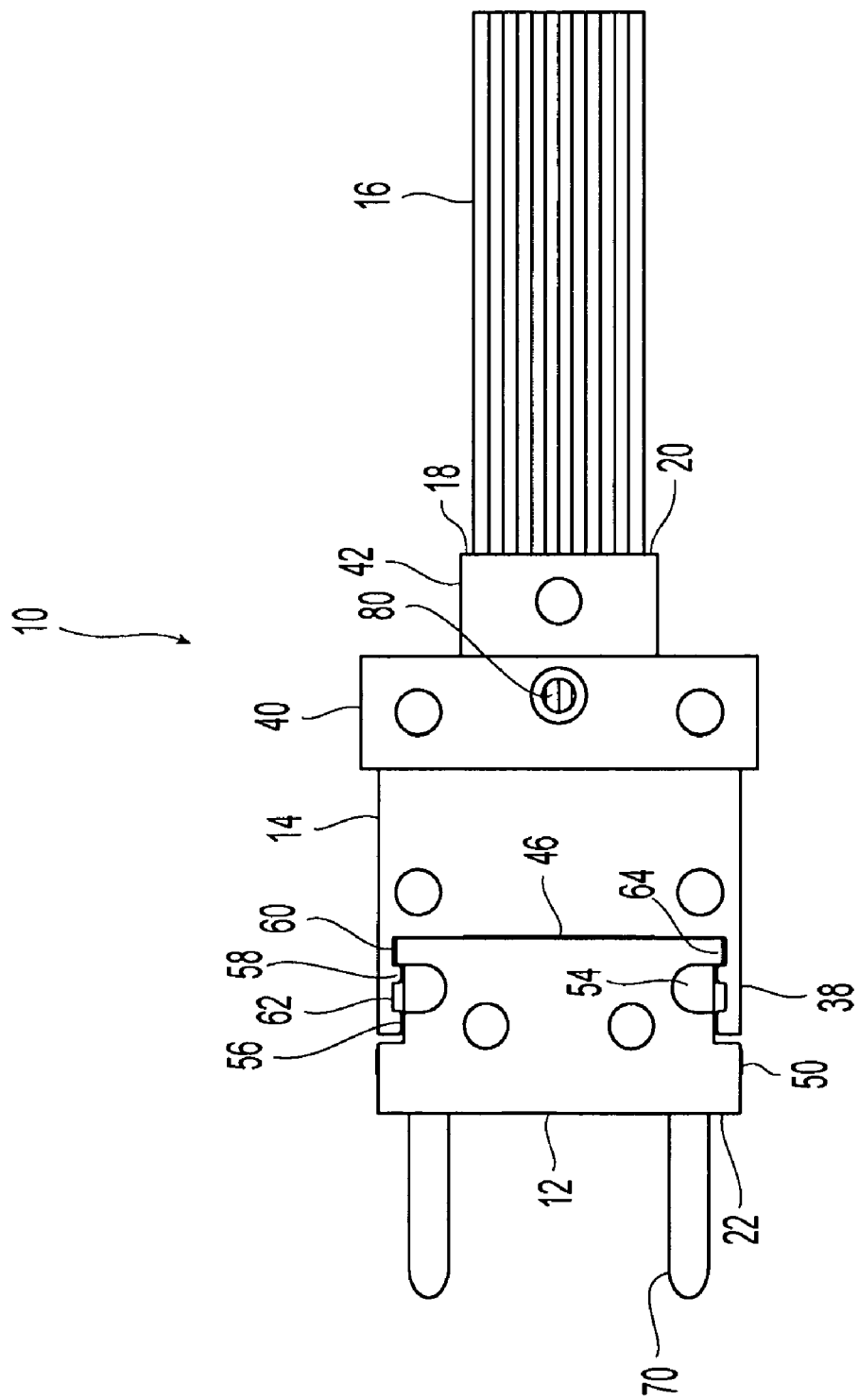
FIG. 4 is a top view of the multi-fiber ferrule of FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIGS. 1-4, a multi-fiber ferrule 10 is illustrated. The multi-fiber ferrule 10 has a front portion 12 and a rear portion 14 with optical fibers 16 inserted through an opening 18 in a rear face 20 of the rear portion 14. See FIG. 3. The optical fibers 16 are preferably in a ribbon format, but loose optical fibers may also be used. Additionally, while there are twelve optical fibers that are illustrated, any number of optical fibers may be used as discussed in more detail below regarding the multi-fiber ferrule.

The front portion 12 has a front face 22 and a rear face 24 with a plurality of optical fiber openings or micro holes 26 extending therebetween. Preferably there are twelve micro holes 26 in the front portion 12, but there may be more or fewer and there are preferably the same number as corresponding holes in the rear portion 14, as discussed below. In each of the micro holes 26 are portions of optical fibers 28 that extend between the front and rear faces that have been pre-installed. Preferably, the optical fibers 28 have been secured in the micro holes 26 in the factory and the front 22 and rear faces 24 have been polished. While the rear face 24 need not be polished, the optical fibers should at least be cleaved so that the front portion 12 can be inserted into the rear portion 14 as illustrated without the optical fibers 28 hitting the rear portion 14.

The rear portion 14 has a main portion 30 that includes a front face 32 and a number of walls 34,36,38 that extend from the front face 32. The rear portion 14 also preferably has a shoulder 40 that is typical on MT ferrules. Additionally, the rear portion 14 has an optical fiber extension 42 that includes the rear face 20 and the opening 18 for the optical fibers. It should noted however, that the rear portion 14 need not have the extension 42 but the rear face 20 and the opening 20 could be on the shoulder 40 instead and still be within the scope of the present invention.

The rear portion 14 also has a plurality of micro holes 44 that extend from and through the front face 32 to the rear face 20 and is in communication with the opening 18. The front face 32 also has a recessed portion 46 that includes the openings of the micro holes 44 so that an index matching gel can be inserted therein to assist with light transmission between the optical fibers 16 in the rear portion 14 and the optical fibers 28 in the front portion 12.

The rear portion 14 also includes walls 34,36,38 that surround at least a portion of the front portion 12 to create an opening 48 in which to place the front portion 12 and secure it to the rear portion 14. While each of the walls 34,36,38 are illustrated to be continuous, solid and of the same length, they do not need to be that way. The walls 34,36,38 preferably do not extend the entire length of the front portion 12, but rather only extend only a portion of the distance from the rear face 24 to the front face 22. As such, the front portion 12 has a forward portion 50 that is wider than a rearward portion 52, so that when the front portion 12 and the rear portion 14 are assembled, they have a constant width. See FIG. 4. The rearward portion 52 has a recessed portion 54 on each side to receive adhesive that assists in bonding the front portion 12 to the rear portion 14. As can best be seen in FIGS. 2 and 4, the walls 34,38 each have two ribs 56,58 that define channels 60,62. Channel 60 is the rearward most channel that corresponds to and receives a projection 64 from the rear end of front portion 12. This engagement of the channel 60 and the projection 64 assists in keeping the front portion 12 secured to the rear portion 14. Channel 62 is disposed adjacent the recessed portion 54 and allows adhesive (not shown) to penetrate between the front portion 12 and the rear portion 14 on both sides of the ferrule 10 and even penetrate underneath the two parts. While the ribs 56,58 are illustrated as being disposed on two of the three walls, they may be disposed on all three walls.

The ribs 56,58 and the projection 64 require that the front portion 12 be placed into the opening 48 from the top or in a direction that is perpendicular to the micro holes in both the front portion 12 and the rear portion 14.

The multi-fiber ferrule 10 also has two guide pin openings 70 that may extend completely through the front portion 12 and into the rear portion 14. However, depending on the length of the front portion 12, the guide pin openings may be disposed only in the front portion 12. However, the guide pins 72 may provide more stability of the assembled multi-fiber ferrule 10 if the penetrate both the front portion 12 and the rear portion 14. Guide pins 72 may be included with the multi-fiber ferrule 10 or be provided by a mating multi-fiber ferrule (not shown). The multi-fiber ferrule 10 also has an opening 80, illustrated in the shoulder 40, that allows for adhesive to be inserted in order to secure the optical fibers 16 to the rear portion 14 of multi-fiber ferrule 10.

Assembling the multi-fiber ferrule 10 includes securing the optical fibers 28 in the front portion 12 and polishing the front face 22 and either polishing the rear face 24 or at least cleaving any optical fibers 28 that extend beyond the rear face 24. The front portion 12 is then inserted into the opening 48 and secured therein. Optical fibers 16 are then inserted into the rear of the rear portion 14 until they engage the rear face 24 of the front portion 12, where they will be in mechanical and optical alignment with the optical fibers 28. An index matching gel is then placed in the recessed portion 46 to facilitate the light transmission between the optical fibers.

Figure 5:
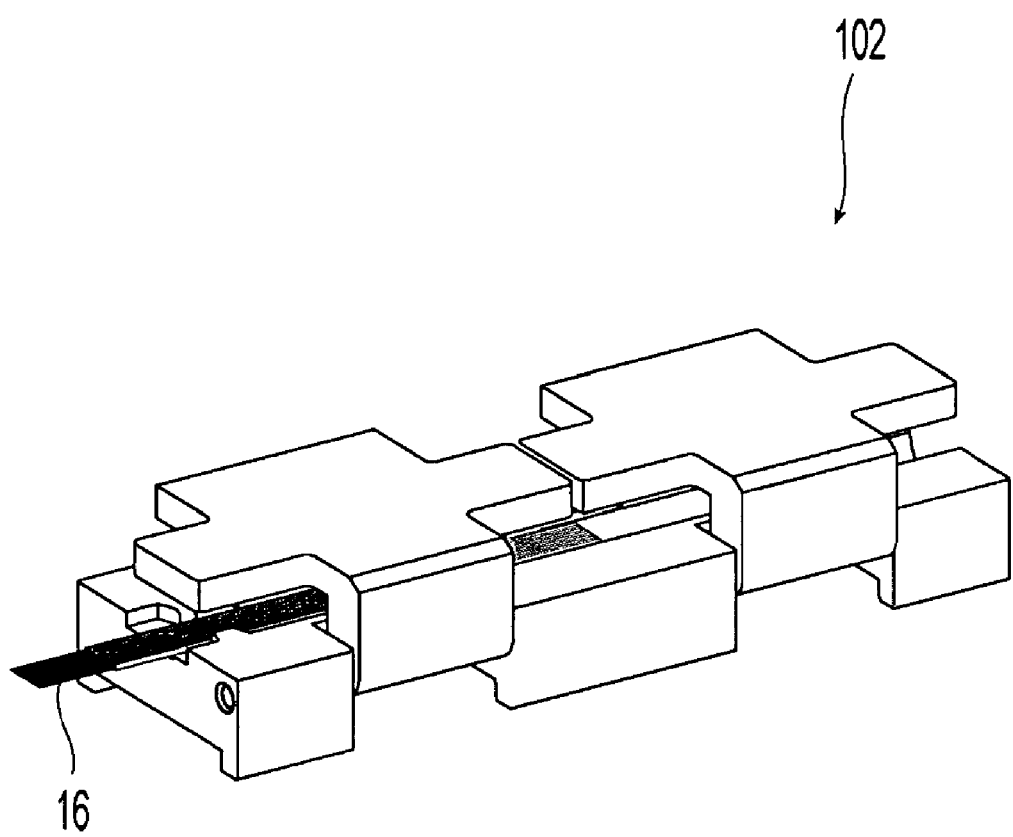
FIG. 5 is a perspective view of an optical fiber holder for use with the present invention.
Figure 6:
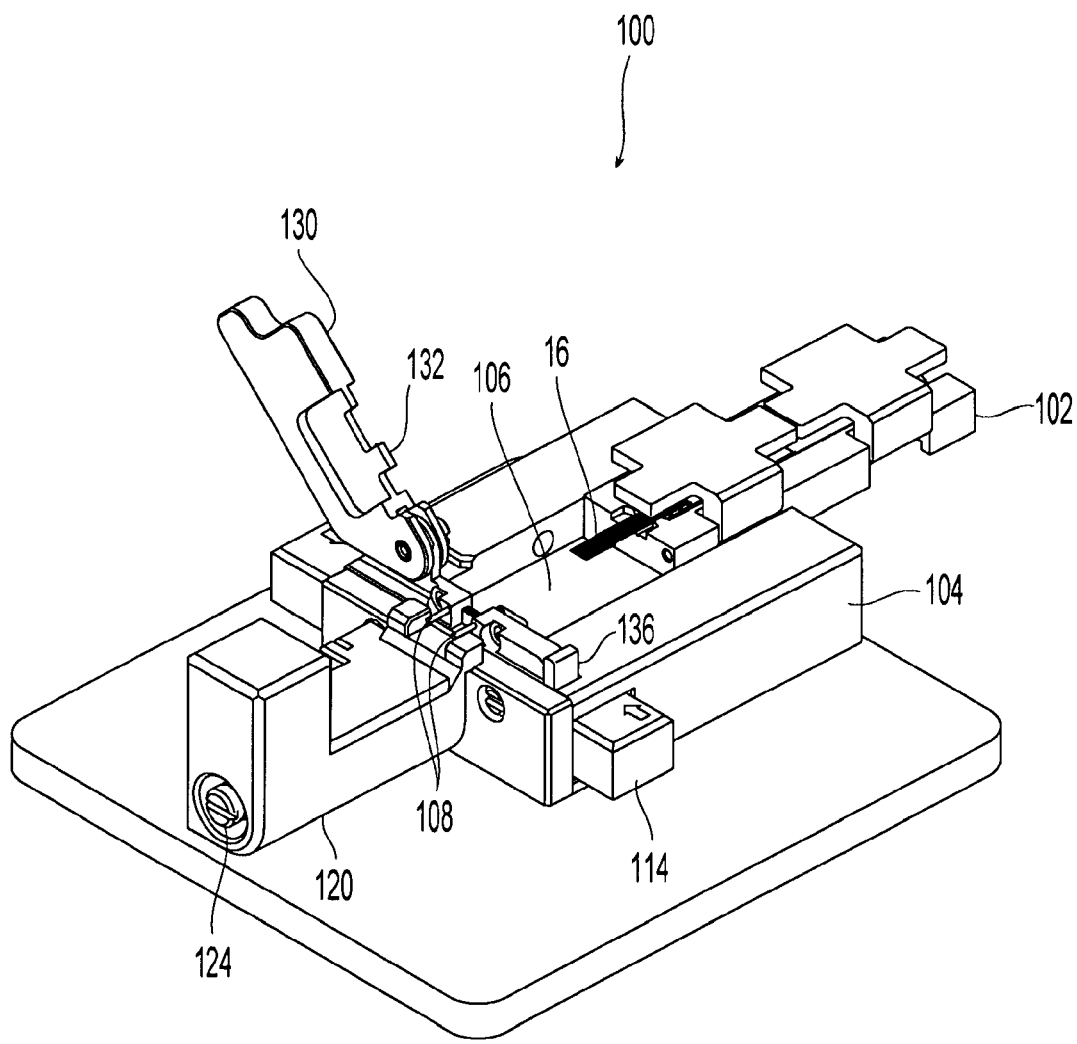
FIG. 6 is a perspective view of one embodiment of a tool to assist with the insertion of optical fibers into a multi-fiber ferrule according to the present invention.

The insertion of the optical fibers 16 into the multi-fiber ferrule 10 can be difficult to ensure that the optical fibers 16 do not become crossed in the rear opening 18 of the multi-fiber ferrule 10, causing problems with the multi-fiber ferrule 10. This is particularly true when the optical fibers 16 are not in a ribbon format, but are loose optical fibers. Thus, a tool 100 has been designed to assist in the out-in-the-field insertion of the optical fibers. Along with tool 100 is an optical fiber holder 102 illustrated in FIG. 5 that securely holds the optical fibers or optical fiber ribbon so that the optical fibers can be stripped and cleaved as is known in the art. The optical fiber holder 102 may have any one of a number of designs, but it should work with and fit into the tool 100 as described in more detail below.

FIGS. 6-11 illustrates one embodiment of tool 100 that assists in inserting the optical fibers 16 into the multi-fiber ferrule 10. The tool 100 has a main body 104 with a central passage 106 that is configured to receive and preferably frictionally hold the optical fiber holder 102 (or an equivalent) therein. The tool 100 has a portion for holding the multi-fiber ferrule 10 (or any other multi-fiber ferrule) in a known relationship to the central passage 106. See FIGS. 6-7. The holding portion preferably includes two guide pins 108 that are attached on adjacent sides of and at the end of the central passage 106 such that when the guide pins 108 are inserted into holes on the rear face of the multi-fiber ferrule, the opening in the rear of the multi-fiber ferrule is aligned with the optical fibers in the optical fiber holder 102 in the central passage 106. Also at the end of the central passage 106 is a channel member 110 having a plurality of channels 112 that are spaced so as to align the optical fibers with the micro holes or optical fibers openings in the multi-fiber ferrule. The channel member 110 is operationally attached to a lever 114 that, depending on the movement of the lever 114, either raises or lowers the channel member 110 so that it engages or disengages the optical fibers that are disposed in the central passage 106, discussed in more detail below.

Figure 8:
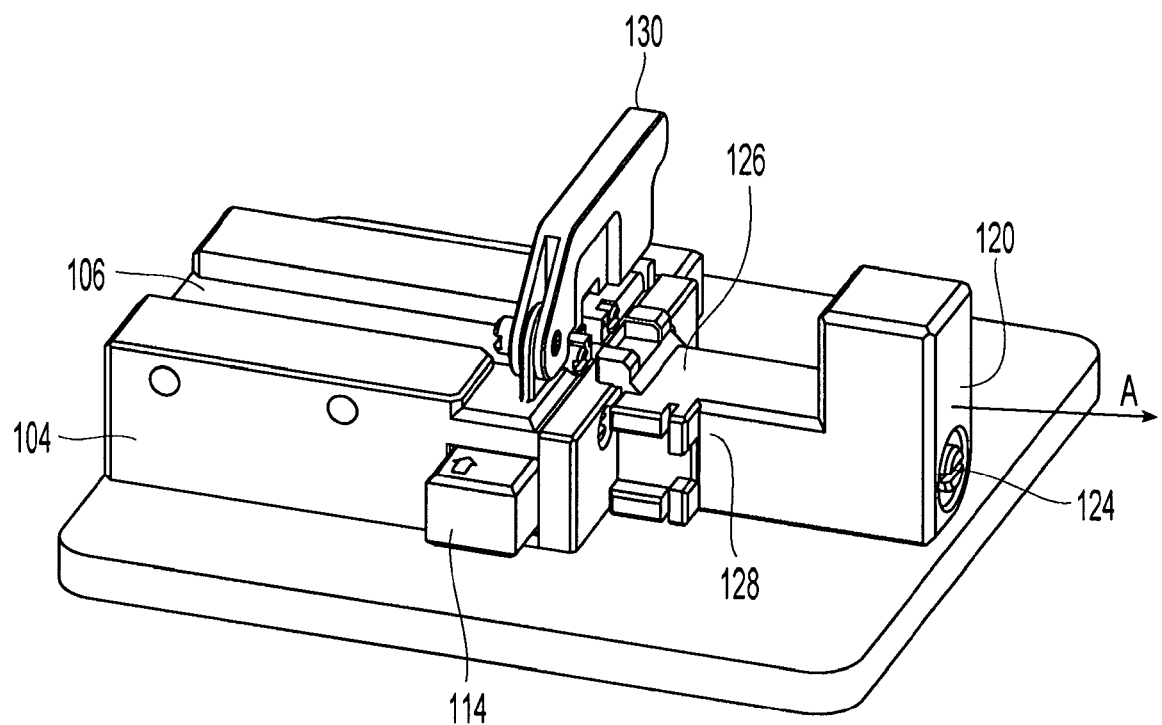
FIG. 8 is a left perspective view of the tool of FIG. 6.

Also at the end of the main body 104 is a handle 120 that is spring loaded and rotationally attached to the main body 104. As best illustrated in FIG. 8, the handle 120 assists in a number of ways. First, the handle 120 elastically holds the multi-fiber ferrule on the two guide pins 108 during insertion of the optical fibers into the multi-fiber ferrule. The handle 120 is moved away from the main body 104 to allow the multi-fiber ferrule to be inserted on the guide pins 108 and then, because of the spring 122 mounted around the pin 124, the handle 120 is biased against the main body 104, thereby holding the multi-fiber ferrule in place for insertion of the optical fibers. See FIG. 9. Second, the handle 120 has two sides with different configurations as illustrated in FIG. 8. The first side 126 is configured to allow the multi-fiber ferrule to be securely held for optical fiber insertion. The second side 128 is configured to allow a jumper (not shown) to be in mechanical and optical communication with the multi-fiber ferrule for testing to ensure that the optical fibers have been correctly installed. The second side is accessed by pulling the handle 120 away from the main body 104 as illustrated by arrow A and rotating it 90° about the pin 124 and then allowing it to be biased against the main body 104. In this rotated position, the multi-fiber ferrule is now accessible to test with the jumper.

Figure 7:
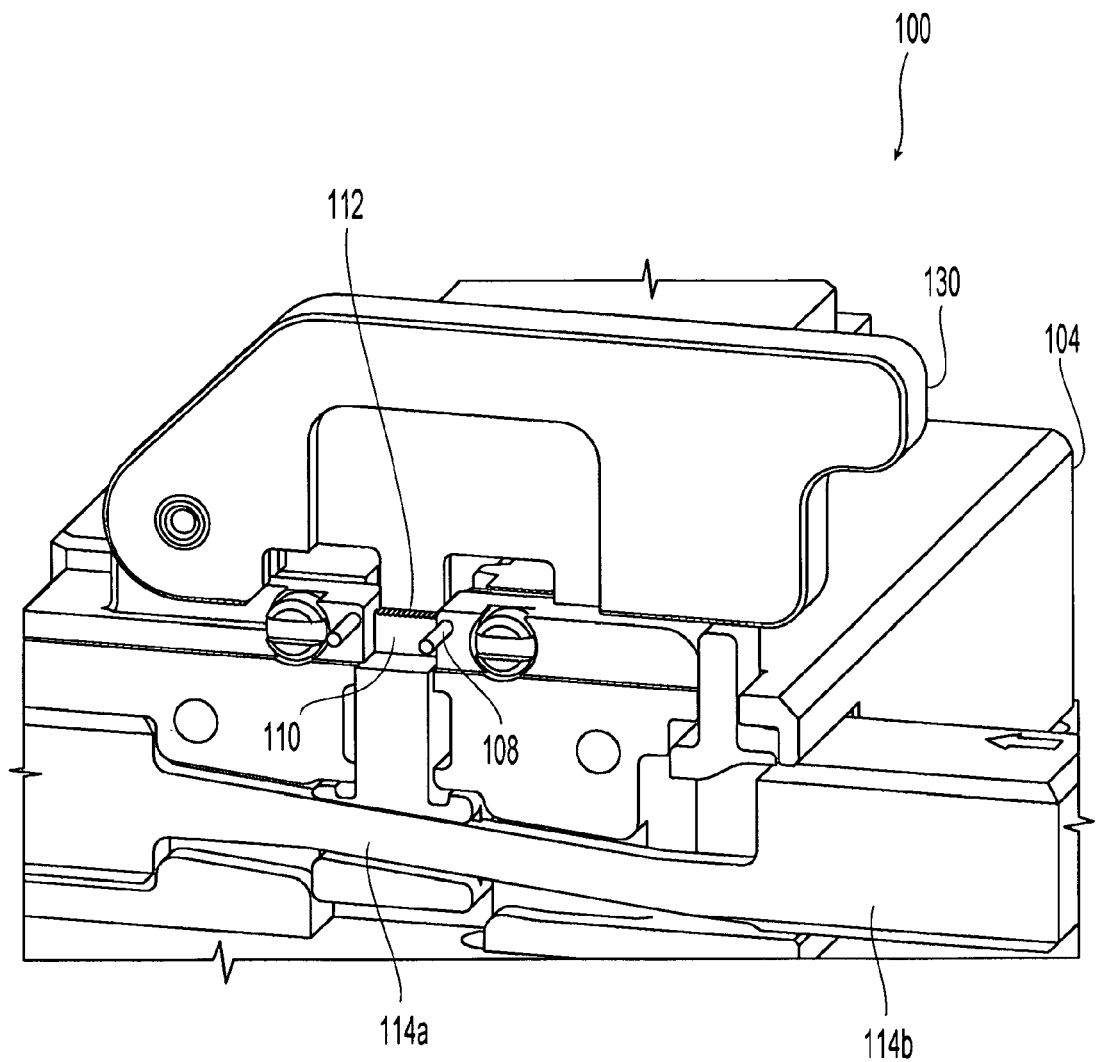
FIG. 7 is a partial view of the tool of FIG. 6 showing the internal components.
Figure 11:
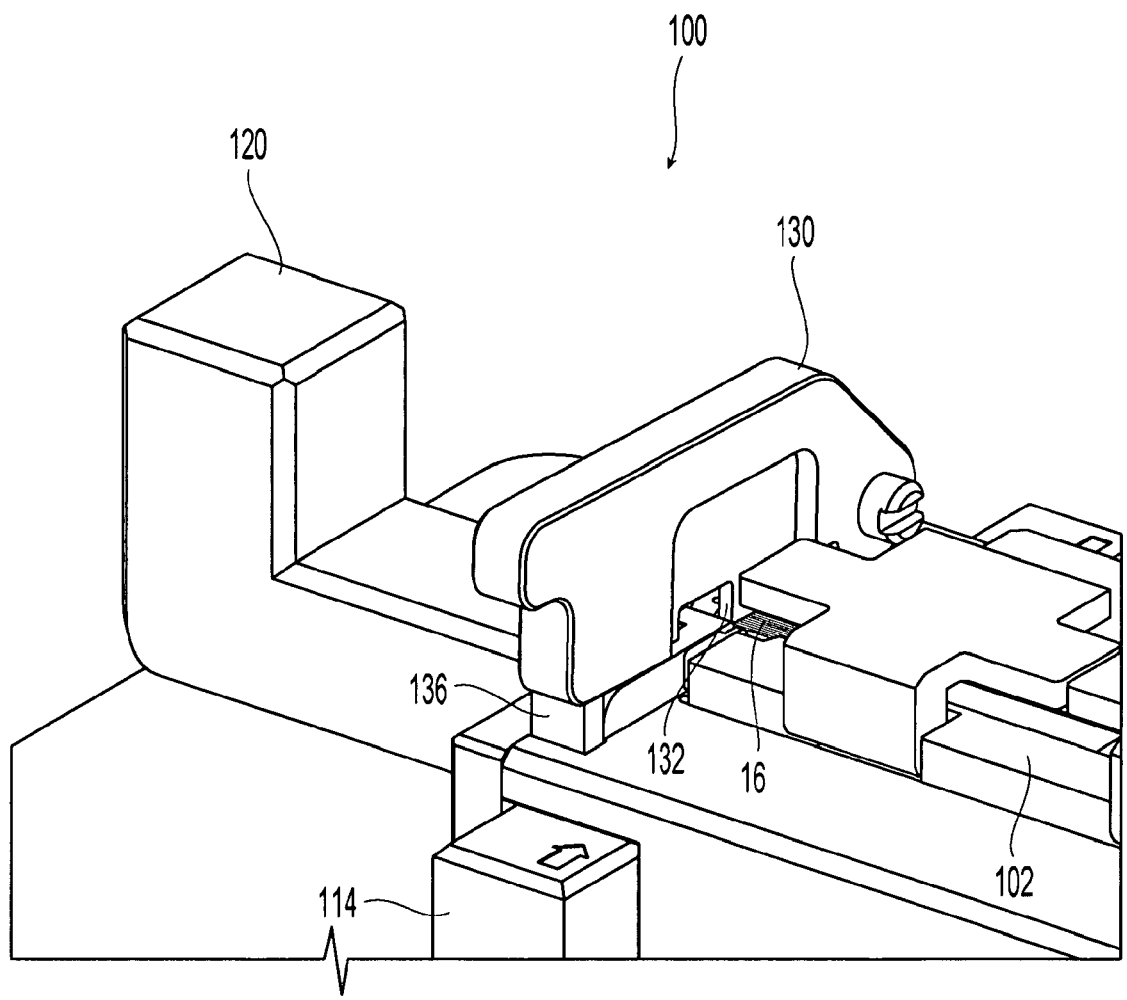
FIG. 11 is a partial view of the tool of FIG. 6 showing the optical fibers fully inserted and the flat clamp portion and channel member moved away from the optical fibers.

The tool 100 also has a top clamp 130 that is rotatably attached to the main body 104. The top clamp 130 has a flat clamp portion 132 that, when in the lowered position (illustrated in FIG. 7), holds the optical fibers in the channel member 110. The top clamp 130 has three positions during the insertion of the optical fibers. A first position, illustrated in FIG. 6 where the top clamp 130 is rotated upward, allows for the multi-fiber ferrule and optical fibers in the optical fiber holder 102 to be loaded into the tool 100. A second position is illustrated in FIG. 7, when the optical fibers are on the channel member 110 and the flat clamp portion 132 holds the optical fibers in correct relationships to one another for insertion into the multi-fiber ferrule. A third position is illustrated in FIG. 11, where the flat clamp portion 132 is lifted slightly off the optical fibers and the channel member 110 (and the channel member is lowered) so that the matrix material that covers the optical fibers can pass between the flat clamp portion 132 and the channel member 110 when the optical fibers are inserted into the micro holes in the multi-fiber ferrule. As best illustrated in FIG. 7, when the lever 114 is pulled out (to the left in FIG. 7), the channel member 100 moves downward due to the shape of the central portion 114a of the lever. At the same time, the lever knob 114b makes contact with a top clamp movement member 136, which moves upward relative to the main body 104 because the configuration of the bottom surface of the top clamp movement member 136 provides a cam-like action. Thus, the movement of lever 114 causes the channel member 110 to move downward and at the same time the flat clamp portion 132 moves upward.

As shown in FIG. 7, the channel member 110 preferably has a plurality of channels 112 that correspond to the number of optical fibers and the spacing of the optical fibers so that the optical fibers can be aligned with and inserted into the holes in the multi-fiber ferrule. While the channels 112 are illustrated to be v-grooves, they may be of any shape or configuration and be within the scope of the present invention.

Figure 9:
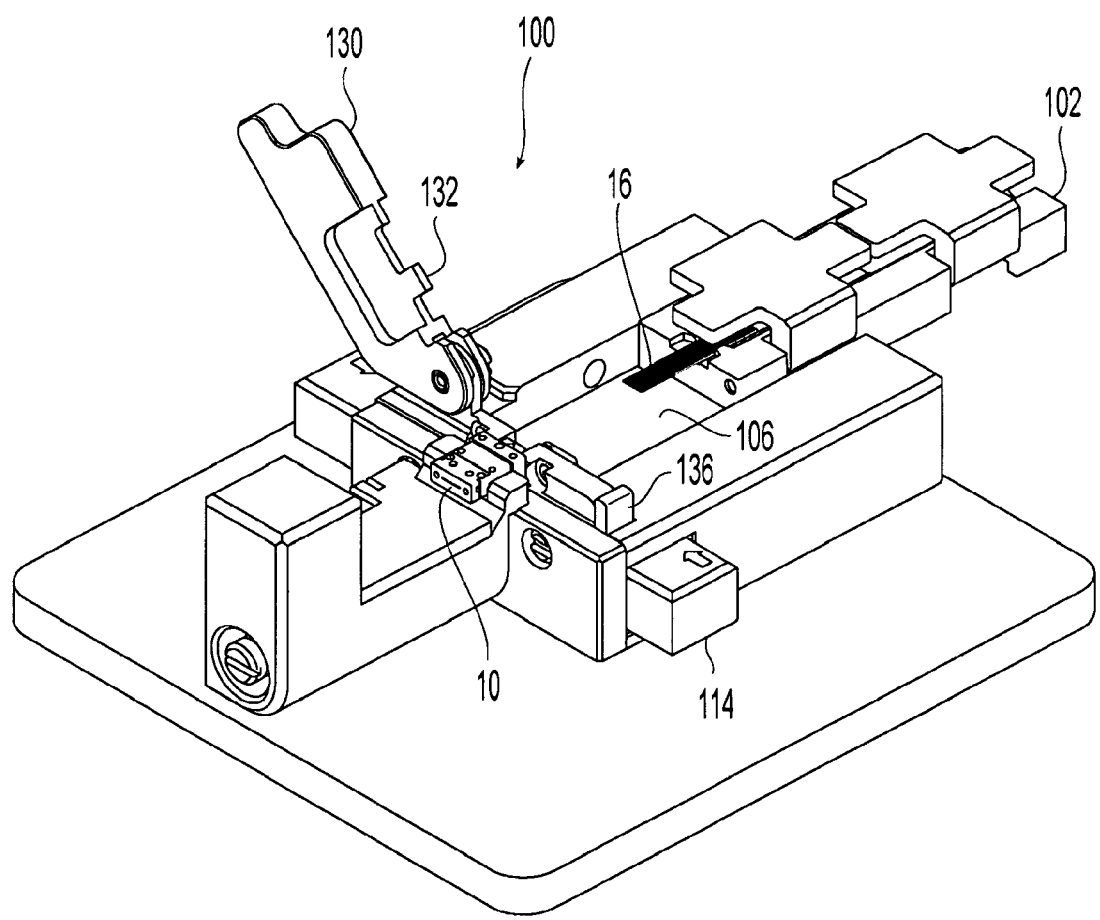
FIG. 9 is a top perspective view of the tool of FIG. 6 with an optical fiber holder and a ferrule inserted thereon.
Figure 10:
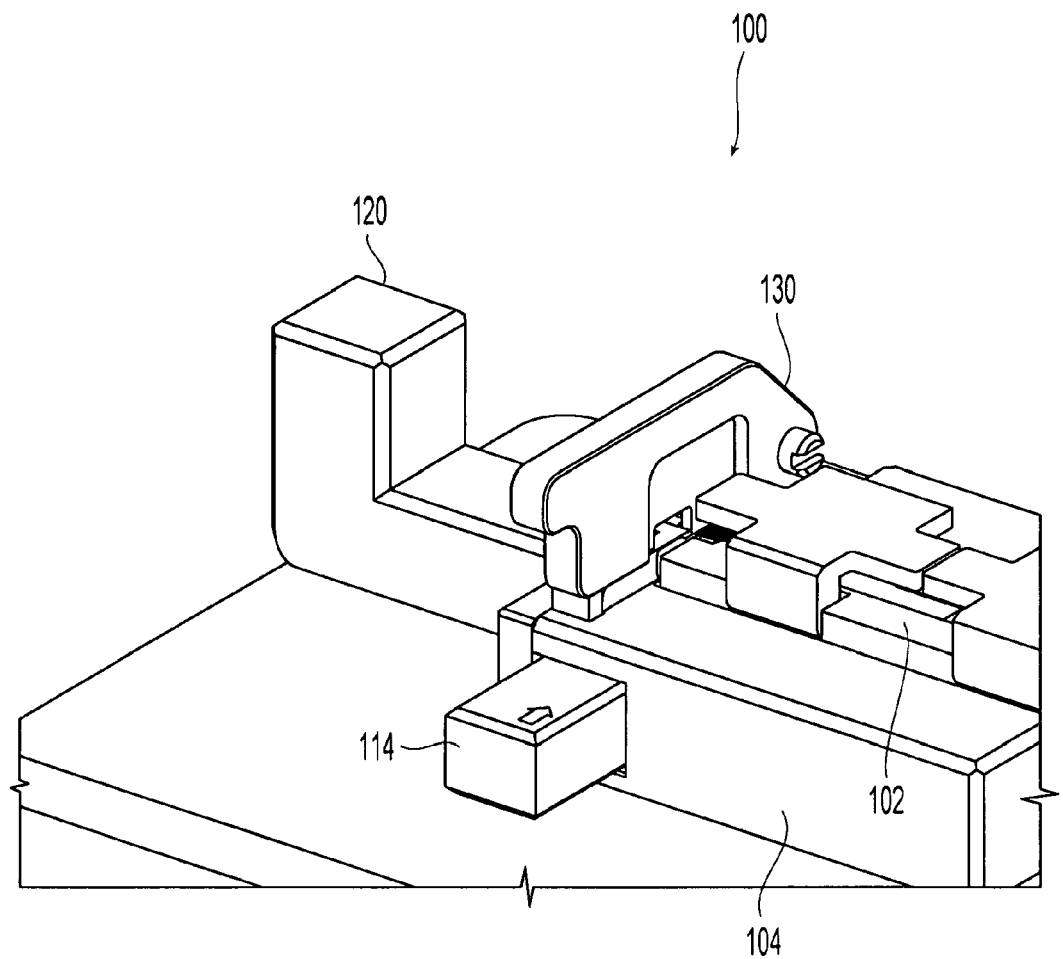
FIG. 10 is partial view of the tool of FIG. 6 showing the optical fibers partially inserted into the ferrule.

The insertion of optical fibers into a multi-fiber ferrule is illustrated in FIGS. 9-11. As illustrated in FIG. 9, optical fibers 16 are secured in an optical fiber holder 102. Preferably, the optical fibers are in a ribbon format, but any configuration or number of optical fibers may be provided. The optical fibers 16 are then stripped of the ribbon matrix material at the end and cleaved so that all of the optical fibers 16 are of the same length, as is known in the art. The optical fiber holder 102 and optical fibers 16 are disposed into the central passage 106. The top clamp 130 is rotated into the up position and the lever 114 is positioned such that the channel member 110 is also in an up position. The multi-fiber ferrule is then placed on the guide pins 108 by pulling the handle 120 away from the main body 104 to allow access to the guide pins. The optical fibers are then laid on the channel member 110 with each of the optical fibers located in an appropriate one of the channels 140. As shown in FIG. 10, the top clamp 130 is then rotated to the closed position and the flat clamp portion 132 holds the optical fibers in the channels 140. The optical fibers and optical fiber holder 102 are moved forward and the optical fibers are inserted into the multi-fiber ferrule. Preferably, the optical fibers are moved until the matrix material of the optical fibers make contact with the flat clamp portion 132 and the channels 140. As illustrated in FIG. 11, the lever 114 is then moved and the channel member 110 is lowered and the top clamp movement member 136 is moved up also moving the flat clamp portion 132 and the optical fibers are advanced further with the matrix material passing between the flat clamp portion 132 and the channels 140 until the optical fibers stop moving forward. The top clamp 130 is then rotated completely upward and an adhesive is inserted into the opening in the multi-fiber ferrule to secure the optical fibers in the ferrule.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber loading device for loading at least two optical fibers into a multi-fiber ferrule comprising:
   a channel configured to receive the at least two optical fibers;
   a multi-fiber ferrule holder in communication with the channel, the multi-fiber ferrule holder configured to receive a multi-fiber ferrule for insertion of the at least two optical fibers
   a lower movable member having optical fiber locators therein, the lower movable member positioning the at least two optical fibers to align with the multi-fiber ferrule;
   an upper movable member configured to make contact with the at least two optical fibers from an upper position; and
   a lever operatively connected to the lower movable member and the upper movable member to move the lower movable member and the upper movable member relative to the channel and multi-fiber ferrule holder.

2. The fiber loading device of claim 1, further comprising at least one guide pin disposed in the fiber loading device to position the multi-fiber ferrule relative to the channel and the optical fiber locators.

3. The fiber loading device of claim 1, wherein the optical fiber locators are v-grooves.

4. The fiber loading device of claim 1, further comprising an optical fiber holder, the optical fiber holder configured to contain the at least two optical fibers and be slidingly disposed in the channel.

5. The fiber loading device of claim 1, wherein the lever slidingly engages the lower movable member and the upper movable member and movement of the lever causes vertical movement of the lower movable member and the upper movable member.

6. A method of inserting the at least two optical fibers into a multi-fiber ferrule using the fiber loading device of claim 1, the at least two optical fibers have a bare fiber portion and a matrix covered portion, comprising the steps of:
   inserting multi-fiber ferrule into the fiber loading device;
   placing the at least two optical fibers into the channel;
   sliding the at least two optical fibers into the multi-fiber ferrule wherein the bare fiber portion is disposed within the multi-fiber ferrule;
   removing the upper and lower movable members from contact with the at least two optical fibers;
   sliding the at least two optical fibers farther into the multi-fiber ferrule wherein at least a portion of the matrix covered portion of the at least two optical fibers are disposed within the multi-fiber ferrule; and
   securing the at least two optical fibers into the multi-fiber ferrule.

7. The method of inserting at least two optical fibers of claim 6, wherein the fiber loading device has at least one guide pin to align the multi-fiber ferrule in the device relative to the channels.

8. The method of inserting at least two optical fibers of claim 6, wherein the step of removing the upper and lower movable members from contact with the at least optical fibers comprises activating a cam to lower the lower movable member, the lower movable member having the optical fiber locators disposed in a top surface thereof.

9. The method of inserting at least two optical fibers of claim 6, further comprising the steps of stripping and cleaving the at least two optical fibers before inserting the at least optical fibers into the fiber loading device.

10. The method of inserting at least two optical fibers of claim 6, wherein the step of securing the at least two optical fibers includes applying an adhesive to the at least two optical fibers and multi-fiber ferrule.

11. The method of inserting at least two optical fibers of claim 6, wherein the at least two optical fibers are inserted into a holder prior to the steps of stripping and cleaving the at least two optical fibers.

12. The method of inserting at least two optical fibers of claim 6, further comprising the step of closing a top portion of the fiber loading device to hold the at least two optical fibers in the channels in the fiber loading device.

13. The method of inserting at least two optical fibers of claim 6, wherein the fiber loading device applies a force to the at least two optical fibers parallel to an axis along a length of optical fibers to align ends of the optical fibers to a reference surface.

* * * * *